US011478848B2

(12) United States Patent
Meese-Marktscheffel et al.

(10) Patent No.: US 11,478,848 B2
(45) Date of Patent: Oct. 25, 2022

(54) POWDER COMPRISING COATED HARD MATERIAL PARTICLES

(71) Applicant: H.C. Starck Tungsten GmbH, Munich (DE)

(72) Inventors: Juliane Meese-Marktscheffel, Goslar (DE); Armin Olbrich, Seesen (DE); Anja Weiland, Langelsheim (DE); Frank Van Der Pütten, Goslar (DE); Ines Lamprecht, Seesen (DE)

(73) Assignee: H.C. Starck Tungsten GmbH, Munich (DE)

( * ) Notice: Subject to any disclaimer, the term of this patent is extended or adjusted under 35 U.S.C. 154(b) by 0 days.

(21) Appl. No.: 16/960,419

(22) PCT Filed: Feb. 6, 2019

(86) PCT No.: PCT/EP2019/052917
§ 371 (c)(1),
(2) Date: Jul. 7, 2020

(87) PCT Pub. No.: WO2019/158418
PCT Pub. Date: Aug. 22, 2019

(65) Prior Publication Data
US 2020/0368810 A1    Nov. 26, 2020

(30) Foreign Application Priority Data
Feb. 14, 2018 (EP) ................................. 18156802

(51) Int. Cl.
*B22F 1/02*         (2006.01)
*B22F 1/16*         (2022.01)
(Continued)

(52) U.S. Cl.
CPC ............... *B22F 1/16* (2022.01); *B22F 1/052* (2022.01); *B33Y 70/00* (2014.12);
(Continued)

(58) Field of Classification Search
None
See application file for complete search history.

(56) References Cited

U.S. PATENT DOCUMENTS 4,214,895 A     7/1980  Gingerich et al.
9,403,137 B2 *  8/2016  Russell ................... B01J 3/062
(Continued)

FOREIGN PATENT DOCUMENTS

CN      101186990 A  *  5/2008
EA          029694 B1       5/2018
(Continued)

OTHER PUBLICATIONS

Yang et al., "Synthesis and Characterization of Cobalt Hydroxide, Cobalt Oxyhydroxide, and Cobalt Oxide Nanodiscs", J. Phys. Chem. C, vol. 114, pp. 111-119 (Year: 2010).*
(Continued)

*Primary Examiner* — Seth Dumbris
(74) *Attorney, Agent, or Firm* — Dority & Manning, P.A.

(57) ABSTRACT

The present invention relates to a method for producing hard materials that are coated with a cobalt hydroxide compound and to powders that comprise the coated hard material particles, and the use thereof.

12 Claims, 5 Drawing Sheets

(51) Int. Cl.
     *B33Y 70/00*       (2020.01)
     *B22F 1/052*      (2022.01)

(52) U.S. Cl.
     CPC ....... *B22F 2302/10* (2013.01); *B22F 2302/45* (2013.01); *Y10T 428/12181* (2015.01)

(56) References Cited

U.S. PATENT DOCUMENTS

2003/0097907 A1    5/2003   Carroll et al.
2004/0161608 A1*  8/2004   Choi .................... H01G 4/008
                                                                        428/404

FOREIGN PATENT DOCUMENTS

| EP | 0 927 772 A1 | 7/1999 |
|---|---|---|
| RU | 2149217 C1 | 5/2000 |
| RU | 2260500 C1 | 9/2005 |
| SU | 1588503 A1 | 8/1990 |
| WO | WO 95/26843 A1 | 10/1995 |
| WO | WO 2004/026509 A1 | 4/2004 |
| WO | WO 2006/069614 A2 | 7/2006 |

OTHER PUBLICATIONS

International Search Report for PCT/EP2019/052917, dated Mar. 8, 2019, 5 pages.
Garshin A.P., et al., "Refractory Core-Shell Powders for Additive Manufacturers", Mechanical Engineering: Network Electronic Scientific Journal, 2017, vol. 5, No. 2, pp. 44-46.
Translation of Russian Search Report for Application No. 2020127094, dated Jul. 27, 2021, 2 pages.

\* cited by examiner

POWDER COMPRISING COATED HARD MATERIAL PARTICLES

CROSS REFERENCE TO RELATED APPLICATIONS

This application is the national stage entry of International Patent Application No. PCT/EP2019/052917 having a filing date of Feb. 6, 2019, which claims priority to and the benefit of European Patent Application No. 18156802.3 filed in the European Patent Office on Feb. 14, 2018, the entire contents of which are incorporated herein by reference.

The present invention relates to a process for preparing hard materials coated with a hydroxidic cobalt compound, and to powders comprising said coated hard material particles, and to the use thereof.

For meanwhile over a hundred years, cemented carbides have been used, inter alia, for preparing particularly high-performing cutting and boring tools.

The term "cemented carbide" means sintered composite materials of metallic hard materials that, when used alone, have a comparably high brittleness because of their high hardness, however, and therefore are usually embedded in a metallic matrix, predominantly from the group of the soft and tough elements of the iron group Fe, Co, Ni (so-called binders or binding metals), in order that they are available for practical use. Metallic hard materials themselves typically consist of carbides, nitrides, silicides and/or borides of various transition metals. Typically, high melting refractory metals, such as tungsten, tantalum, niobium and/or molybdenum, but also other transition metals, such as chromium, vanadium and titanium, including their mixed crystals are used as said transition metals.

One of the most common cemented carbides is WC/Co cemented carbide, which still has the greatest market share by far, there being a large range of WC powders in terms of particle size, particle size distribution and cobalt content, depending on the use thereof.

In order to obtain a uniform structure in the material, the WC powder must be intimately mixed with Co powder at first in the conventional (non-additive) production of cemented carbides by powder metallurgy. This is usually done by milling the WC powder with a suitable cobalt powder, for example, in attritors or agitator bead mills together, typically in the presence of liquid hydrocarbons (e.g., hexane), which are removed again by vacuum drying after completion of the mixing process. Subsequently, usually after the addition of additives, such as paraffine or organic waxes, a green body is pressed, for example, by extruding, injection molding/MIM (hot or cold pressing), or axial cold pressing. After removing the binder from the green body at moderate temperatures for removing the remaining organic components, the further compaction is effected by sintering at temperatures within a range of the melting temperature of the metallic binder. In a subsequent step, hot isostatic afterpressing can optionally be performed, and the resulting cemented carbide component may be subjected to a further mechanical afterprocessing (such as turning, milling and/or grinding), and/or coating processes (CVD or PVD).

Of particular importance in the cemented carbide production is the sintering step, in which, as set forth above, a practically dense body made of cemented carbide is formed by the sintering at high temperatures, for example, near the melting point of cobalt (1495° C.). In particular, the optimum distribution of the cobalt and WC particles in the premix is of high importance, because the adjusting of such distribution can be associated with considerable difficulties, especially if it is taken into account that both ultra-fine (nano) WC powders, through medium grades in the 1 µm range, up to quite coarse WC powders (around 40-100 µm) must be mixed as homogeneously as possible with cobalt metal powder having a much lower mass.

A more homogeneous distribution of cobalt that would be substantially better from the beginning could certainly be achieved by coating the WC particles with cobalt. Thus, it has long been desired in the cemented carbide industry that such powders for testing purposes may be made available by an industrially practicable and economically efficient manufacturing process. For example, it is conceivable that the tedious common milling of WC and cobalt powders in attritors and agitator bead mills could be dispensed with completely if the coating was sufficiently uniform. This also means that the handling of organic solvents, which is extremely demanding in terms of safety requirements, could also be omitted, and also, the manufacturer of the cemented carbide could also minimize the operations involving the handling of cobalt metal powder, which has been considered not only cancerogenic by inhalation, but also dermally cancerogenic in the meantime.

In principle, the coating of the hard material particles with metallic cobalt can be achieved directly by a chemical reaction of $Co^{2+}$ ions. This is generally known, and the coating of substrates with, for example, nickel or cobalt is being utilized to a large extent with specific bath compositions in the so-called electroless plating. Common reducing agents include, for example, hypophosphites, hydrazine or organic reducing agents having a sufficient reducing power. However, in these processes, in order that the metal deposition actually takes place on the desired substrate and so-called wild precipitations do not occur, the substrate surface must usually be seeded with foreign crystals, such as palladium crystals, which then serve as seeds for the actual metal deposition. In the manufacture of cemented carbide powders, the use of palladium is not possible for economic and other reasons.

WO 2006/069614 describes a process in which a metallic coating with cobalt is achieved by reduction out of an Co(II) salt ammonia solution with hydrogen at 180° C. and under a pressure of 34.5 bar.

WO 2004/26509 describes a process in which the hard material particles are coated at first with a metal salt, and the metal salt layer is subsequently supposed to be converted intermediately to oxidic or hydroxidic compounds at 200° C. under pressure, the reduction to metallic cobalt being effected finally by pressurizing the reactor with hydrogen under a pressure of 30 bar and at a temperature of 200° C.

It is a common feature of such processes that the metallic cobalt is produced by reduction with hydrogen in an aqueous medium at elevated temperature and under a very high hydrogen pressure of at least 30 bar in autoclaves.

It is the object of the present invention to provide a simple process for coating hard material particles with cobalt that avoids the extreme reaction conditions, which are very demanding in terms of safety management, as required in the prior art, and at the same time allows for a very uniform application of the coating.

Surprisingly, it has been found that this object can be achieved by a pressureless process in which hard material particles are coated with a hydroxidic compound of cobalt in a first step, and said hydroxidic cobalt compound is reduced to metallic cobalt in a second step.

Therefore, the present invention firstly relates to a process for preparing coated hard material particles, comprising the following steps:
a) providing an aqueous solution comprising at least one cobaltammine complex;
b) adding hard material particles to the aqueous solution to obtain a suspension comprising hard material particles coated with a hydroxidic cobalt compound; and
c) separating off the coated hard material particles.

The hydroxidic compound of cobalt is preferably selected from the group consisting of cobalt(III) hydroxide, cobalt oxyhydroxide, cobalt(II) hydroxide, and mixtures thereof.

Within the scope of the present invention, the trivalent cobalt hydroxide compounds are compounds of chemical formula $CoO_x(OH)_{3-2x}$, with $0 \leq x \leq 1$.

Further within the scope of the present invention, said cobalt(II) hydroxide is the compound of chemical formula $Co(OH)_2$.

The mixtures of the two within the meaning of the present invention are compounds of chemical formula $CoO_x(OH)_y$ with $y=z-2x$, wherein z is the oxidation state of cobalt with $2 \leq z \leq 3$, and $0 \leq x \leq z-2$.

Preferably, the value of z meets $2.5 \leq z \leq 3$, and more preferably $2.9 < z \leq 3$.

In a preferred embodiment of the process according to the invention, the hard material particles are carbides, nitrides and/or carbonitrides of the transition metals selected from the group consisting of tungsten, tantalum, niobium, molybdenum, chromium, vanadium, titanium, and mixtures thereof.

Hard materials are characterized, in particular, by a high hardness in connection with a high melting point. Therefore, an embodiment in which said hard material is tungsten carbide (WC) is preferred.

Surprisingly, it has been found that a particularly uniform coating of the hard material particles with the hydroxidic cobalt compound can be achieved if Co(III) hexammine complexes are used as said cobaltammine complex. Therefore, an embodiment in which said cobaltammine complex is a cobalt hexammine complex is preferred.

In a preferred embodiment, the aqueous solution in step a) is prepared by admixing an aqueous solution comprising at least one Co(II) salt with ammonia, and subsequently admixing the mixture obtained with an oxidant.

Preferably, said oxidant is selected from the group consisting of air, oxygen, hydrogen peroxide, and mixtures thereof.

In a further preferred embodiment of the process according to the invention, said Co(II) salt is selected from the group consisting of sulfate, nitrate, chloride, acetate, and mixtures thereof. More preferably, said Co(II) salt is cobalt sulfate. In an alternatively preferred embodiment, said Co(II) salt is cobalt nitrate.

Without being bound to a particular theory, it is considered that the formation of the cobalt(III)ammine complexes takes place, for example, according to the following equation.

$[Co(H_2O)_6]^{2+}+SO_4^{2-}+6NH_3+0,25O_2+0,5H_2O \rightarrow [Co(NH_3)_6]^{3+}+SO_4^{2-}+OH^-+6H_2O$ Preferably, sodium hydroxide is further added to the suspension in step b) of the process according to the invention. Surprisingly, it has been found that not only an enhanced reaction can be achieved, but the tendency to agglomerate of the coated hard material particles may also be reduced, by the addition of sodium hydroxide. In a further preferred embodiment, the process according to the invention can be performed by using ultrasound. Surprisingly, it has been found that the tendency to agglomerate of the particles can be further reduced, in particular, in this way. Alternatively or additionally, the tendency to agglomerate can be influenced, for example, by applying ultrasound or adapting the stirring intensity.

It is assumed that if the addition of sodium hydroxide is omitted in the precipitation of the hydroxidic cobalt compound, the reaction of the cobalt(III) ammine complexes proceeds by heating and expelling excess ammonia, as shown with CoOOH as an example:

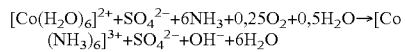

$[Co(NH_3)_6]^{3+}+H_2O+OH^-SO_4^{2-} \rightarrow CoOOH+2NH_4^+ + SO_4^{2-}+4NH_3\uparrow$ Therefore, in a preferred embodiment, the suspension is heated to a temperature of from 60 to 100° C., more preferably from 65 to 85° C. In an alternative embodiment, the reaction of the cobalt(III) ammine complex may also be supported by working under reduced pressure.

The process according to the invention does not rely on a particular grain size of the hard material particles. Therefore, an embodiment is preferred in which the hard material particles have a particle size of from 0.1 to 100 μm, preferably from 0.5 to 50 μm, more preferably from 1 to 40 μm. The particle size was determined according to ASTM E B330 using a Fisher Model Sub-Sieve Sizer (FSSS). Within the meaning of the present invention, "particle size" refers to the equivalent diameter of the particle.

In a preferred embodiment, the process according to the invention further comprises, subsequent to step c), a step d) in which the hydroxidic cobalt compound is reduced to cobalt metal. Surprisingly, it has been found that the reduction can be realized under normal pressure in a hydrogen flow, and that the conditions such as increased pressure or specific devices as described in the prior art are not necessary. Therefore, an embodiment in which the reduction of the hydroxidic cobalt compound is performed under normal pressure in a hydrogen flow is preferred.

The present invention further relates to coated hard material particles obtained by this process.

The present invention further relates to a powder comprising hard material particles, characterized in that said hard material particles have a coating of a hydroxidic cobalt compound. Preferably, the coated hard material particles are prepared by the process according to the invention.

In a preferred embodiment, the chemical composition of the hydroxidic cobalt compound is described by the formula $CoO_x(OH)_y$, wherein $y=z-2x$, z represents the oxidation state of cobalt, with $2 \leq z \leq 3$, and $0 \leq x \leq z-2$. In a particularly preferred embodiment, $2.5 \leq z \leq 3$, more preferably $2.9 \leq z \leq 3$, and even more preferably $2.98 \leq z \leq 3$.

In a further preferred embodiment, the hard material particles are coated with metallic cobalt.

Surprisingly, it has been found that the powders according to the invention are characterized by a uniform and almost complete coating with the hydroxidic cobalt compound.

The powders according to the invention are characterized by a very uniform deposition of the hydroxidic cobalt compound on the hard material particles.

In a preferred embodiment, the powders according to the invention have a BET specific surface area of from 0.05 to 5 g/m², preferably from 0.05 to 2 g/m², as determined according to ASTM D 3663 if the cobalt is in a metallic form. If the cobalt is in the hydroxidic form, the powders preferably have a specific surface area of larger than 5 m²/g, preferably larger than 10 m²/g to 20 m²/g.

The powder according to the invention is further characterized by a high sintering activity. Therefore, the powder according to the invention is suitable, for example, for the preparation of components that are characterized by their high mechanical loadability and high wear resistance. These properties are mainly due to the characteristic hard materials present in the powder. In order that the finished component may also benefit from these properties, the content of hard material particles in the cemented carbide should be as high as possible. This means by implication that the content of binding metal should be limited to the lowest necessary amount that is needed to counteract the natural brittleness of the hard materials. The use of cobalt as a binding metal further represents a cost factor that should not be neglected, so that the content of binding metal should not exceed the required technically minimum measure for this reason, too. Therefore, an embodiment of the present invention in which the coating comprises a maximum of 20% by weight, preferably from 2 to 15% by weight, of the powder is preferred.

The powder according to the invention is characterized by a low tendency to agglomerate. A measure of the tendency to agglomerate is the ratio of the D50 values of the particle size distributions of the coated to the uncoated material, for example.

In a preferred embodiment, the ratio of the particle size of the coated hard material particles to the particle size of the uncoated hard material particles is from 1.05 to 15, preferably from 1.05 to 5, more preferably from 1.05 to 1.5, wherein the calculation is based on the D50 value of the grain size distribution as measured with a Master Sizer according to ISO 13320.

A completely different quantity is so-called Fisher value FSSS according to ASTM B330, to be understood as an equivalent diameter for an average size of the primary grains. According to the invention, this value increases only to a low extent by the coating, for example, from 1.0 to 1.3, for a commercially available WC DS 100 material. Therefore, this invention also further relates to hard material particles coated with a hydroxidic cobalt compound and/or metallic cobalt, which are characterized in that the ratio of the FSSS values according to ASTM B330 of the coated material to the uncoated material is from 1.01 to 4, preferably from 1.01 to 2, and more preferably from 1.01 to 1.5.

In a further preferred embodiment, the coated hard material particles are present as discrete particles in the powder according to the invention. Surprisingly, it has been found that the strong agglomeration usually observed does not occur in the powders according to the invention, or only so to a very low extent. Without being bound to a particular theory, this is attributed to the selected coating material and to the specific method of depositing it.

The powders according to the invention are preferably employed for the preparation of cemented carbides, wherein both conventional manufacturing processes and additive manufacturing technologies may be used for processing.

Therefore, the present invention further relates to the use of the coated hard material particles according to the invention and/or of the powders according to the invention in conventional manufacturing processes. Said particles and/or powders can be processed, for example, via the classical powder metallurgy route through shaping, compacting, removal of binder, and sintering, or the sinter HIP method (HIP: hot isostatic pressing). Surprisingly, it has been found that the upstream complicated mixing step between the hard material and the binder metal powder, requiring high safety standards, that is usually necessary in the course of manufacture can be omitted in part or even completely by the use according to the invention.

The present invention further relates to the use of the coated hard material particles according to the invention and/or of the powders according to the invention in additive manufacturing processes. In such manufacturing processes, the powders and/or particles are preferably directly employed as a powder bed, in a spray-granulated powder form, or as a component of printing inks. Preferably, the additive manufacturing processes are powder bed fusion processes, such as selective laser sintering, binder jetting technologies, or direct printing methods.

The present invention is further explained by the following Examples, which is by no means to be understood as a limitation to the inventive idea.

At first, a solution containing cobaltammine complexes was prepared as follows:

a) In 4.5 liters of water, 1145 g of cobalt sulfate heptahydrate was dissolved, and the solution was subsequently admixed with 3 liters of conc. (25%) ammonia with stirring. Thereafter, air was passed in through a glass frit for 16 hours. An initial precipitate of blue $Co(OH)_2$ dissolved quickly to obtain a deep red solution. The latter was filled up with water to exactly 8.00 liters, and 1500 ml each was employed for coating 400 g of WC (5 different grades).

b) The coating of tungsten carbide with the hydroxidic cobalt compound by the process according to the invention was performed as follows: In a heatable stirring reactor, 2 liters of water was charged, and 400 g of WC was suspended therein with stirring. The suspension was then admixed with 1500 ml of the cobalt hexammine complex solution, and filled up with about 0.5 liter of water to 4 liters. Subsequently, the solution was slowly heated to 80° C. within 5 hours with permanent stirring, and then stirred further at this temperature for another 3 hours. During all this time, losses of liquid were compensated by evaporation by metering water to thus keep the volume of the suspension constant. Ammonia was expelled, the pH sank from 10 to from 6.6 to 6.8, and the suspension took a dark brown color.

c) The suspension was filtered while still hot, the dark brown filter cake was washed with 2 liters of warm water (60° C.), followed by drying in a drying cabinet at 90° C. over night. The amounts obtained and analyzed properties of the tungsten carbides coated with a hydroxidic cobalt compound according to the invention are summarized in Table 1. Unprecipitated cobalt from the mother liquors and filtrates was converted to cobalt(II) salts to be thus reusable.

d) From each of the obtained tungsten carbides coated with a hydroxidic cobalt compound, a part was reduced as follows: Two hundred grams of the particles were weighed out in a metal boat (Thermax). The boat was placed into a tubular furnace. After flushing with argon, hydrogen was passed through the furnace, and the temperature was increased at 10° C./min to 650° C. at first. This temperature was maintained for 2 hours, followed by further heating at 10° C./min to 750° C. After a holding period of also 2 hours at 750° C., the furnace was allowed to cool down under argon. The amounts obtained and analyzed properties of the tungsten carbides coated with metallic cobalt according to the invention are also summarized in the following Table 1.

TABLE 1

|  | Example 1 | Example 2 | Example 3 | Example 4 | Example 5 |
|---|---|---|---|---|---|
| Tungsten carbides employed (standard grades H. C. Starck Tungsten GmbH) | | | | | |
| WC grade: | WC DS60 | WC DS100 | WC DS250 | WC MAS900 | WC MAS4000 |
| Equivalent diameter FSSS [µm]: | 0.64 | 1.04 | 2.4 | 11.4 | 35 |
| Particle size distribution $D_{50}$ [µm]: | 0.81 | 1.26 | 3.24 | 13.2 | 51.9 |
| Specific surface area [m$^2$/g]: | 1.70 | 1.01 | 0.45 | 0.09 | 0.03 |
| Coating of tungsten carbides with hydroxidic cobalt compound | | | | | |
| Mass of WC charged [g]: | 400 | 400 | 400 | 400 | 400 |
| Yield of WC/CoO$_x$(OH)$_y$ [g]: | 466.6 | 457.0 | 465.3 | 458.3 | 467.1 |
| Co [ma %]: | 7.71 | 7.97 | 7.83 | 7.91 | 7.74 |
| Particle size distribution $D_{50}$ [µm]: | 9.58 | 7.64 | 13.89 | 15.18 | 63.2 |
| Reduction of the tungsten carbides coated with hydroxidic cobalt compound | | | | | |
| Mass of WC/Co$_x$(OH)$_y$ charged [g]: | 200 | 200 | 200 | 200 | 200 |
| Yield of WC/Co [g]: | 187.2 | 191.4 | 188.0 | 190.8 | 187.1 |
| Co [ma %]: | 8.24 | 8.37 | 8.33 | 8.29 | 8.27 |
| Equivalent diameter FSSS [µm]: | 1.02 | 1.28 | 3.26 | | |
| Particle size distribution $D_{50}$ [µm]: | 10.49 | 8.49 | 15.74 | 18.06 | 68.5 |
| Specific surface area [m$^2$/g]: | 1.88 | 1.32 | 0.53 | 0.18 | 0.06 |

FIG. 1a shows the original WC powder with a particle size of 1.04 µm (FSSS).

FIG. 1b shows the WC particles coated with CoO$_x$(OH)$_y$.

FIG. 1c shows the coated particles in which the cobalt is in the form of a metal. The particle size was measured by the FSSS method to be 1.28 µm.

A commercially available WC DS100 from the company H.C. Starck Tungsten GmbH with an FSSS value of 1.04 µm and a BET specific surface area of 1.01 m$^2$/g was used as the starting material in this Example (Example 2 from Table 1). The D50 value of the particle size distribution of the WC powder employed was 1.2 µm. The resulting final product WC/Co had an FSSS value of 1.28 µm and a BET specific surface area of 1.32 m$^2$/g. The D50 value of the particle size distribution as measured by laser diffraction according to ISO 13320 was 8.5 µm. The cobalt content was determined to be 8.4%. As a comparison shows, the specific surface area (BET ISO 9277) and the FSSS value have changed just a little. The small change shows that the particles according to the invention have a low tendency to agglomeration. Because of this property, the powders according to the invention are very suitable for use in conventional manufacturing processes of cemented carbide components, where they can be pressed into green bodies. Because of the resulting flowability, the powders may also be employed for additive manufacturing methods, such as laser melting, in which the finished component is built up additively.

Figure 1A:
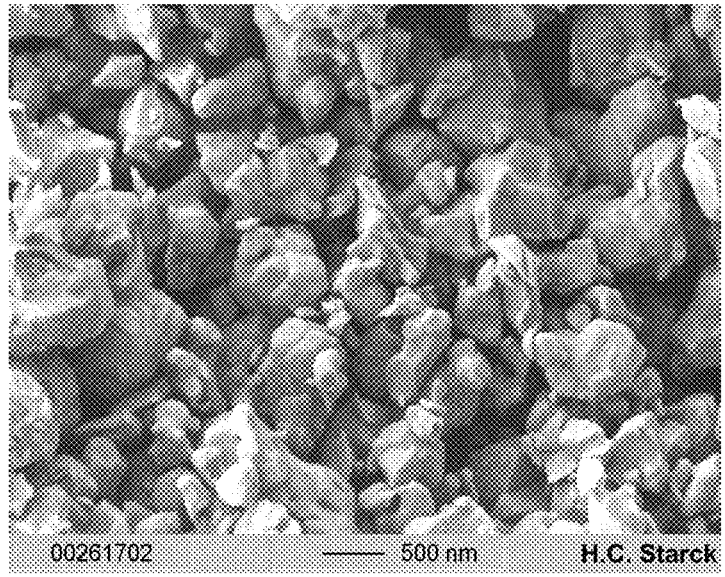
FIGS. 1a, 1b and 1c show individual steps of the process according to the invention for the fine tungsten carbide grade WC DS100.
Figure 1B:
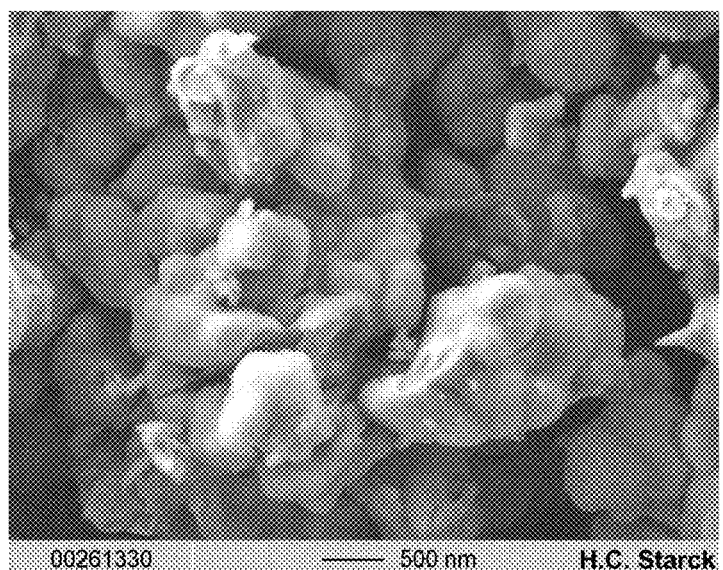
Figure 1C:
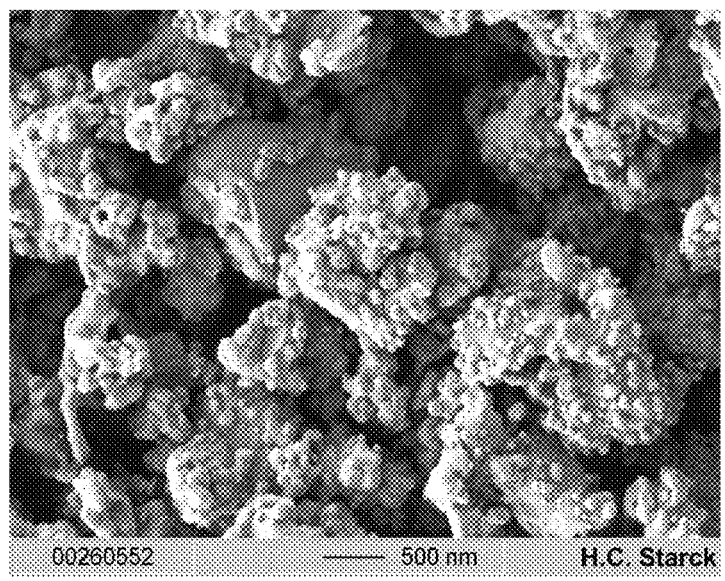
Figure 2:
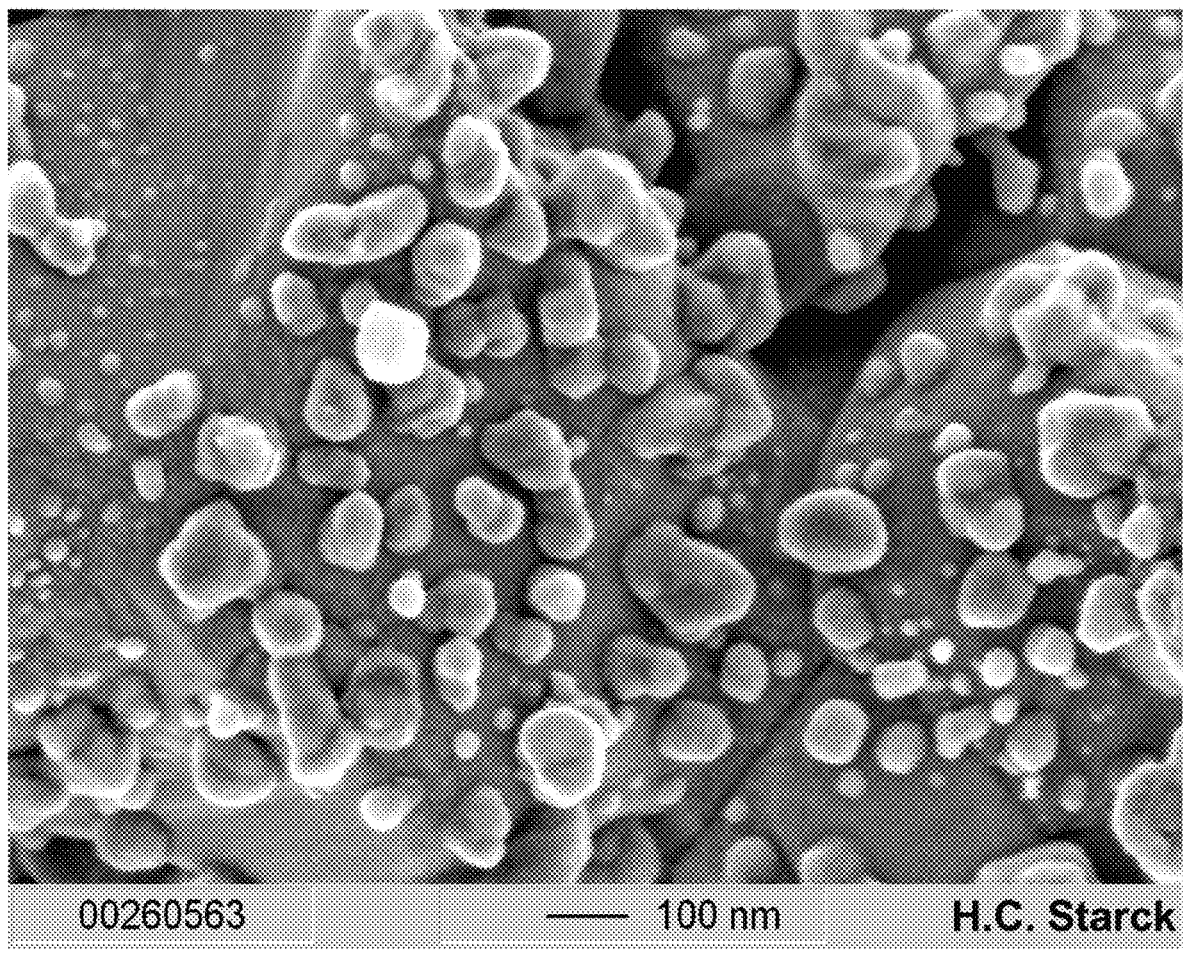

FIG. 2 shows an eighty thousand times magnification of the WC particles coated with cobalt metal according to the invention according to Example 2.

Figure 3:
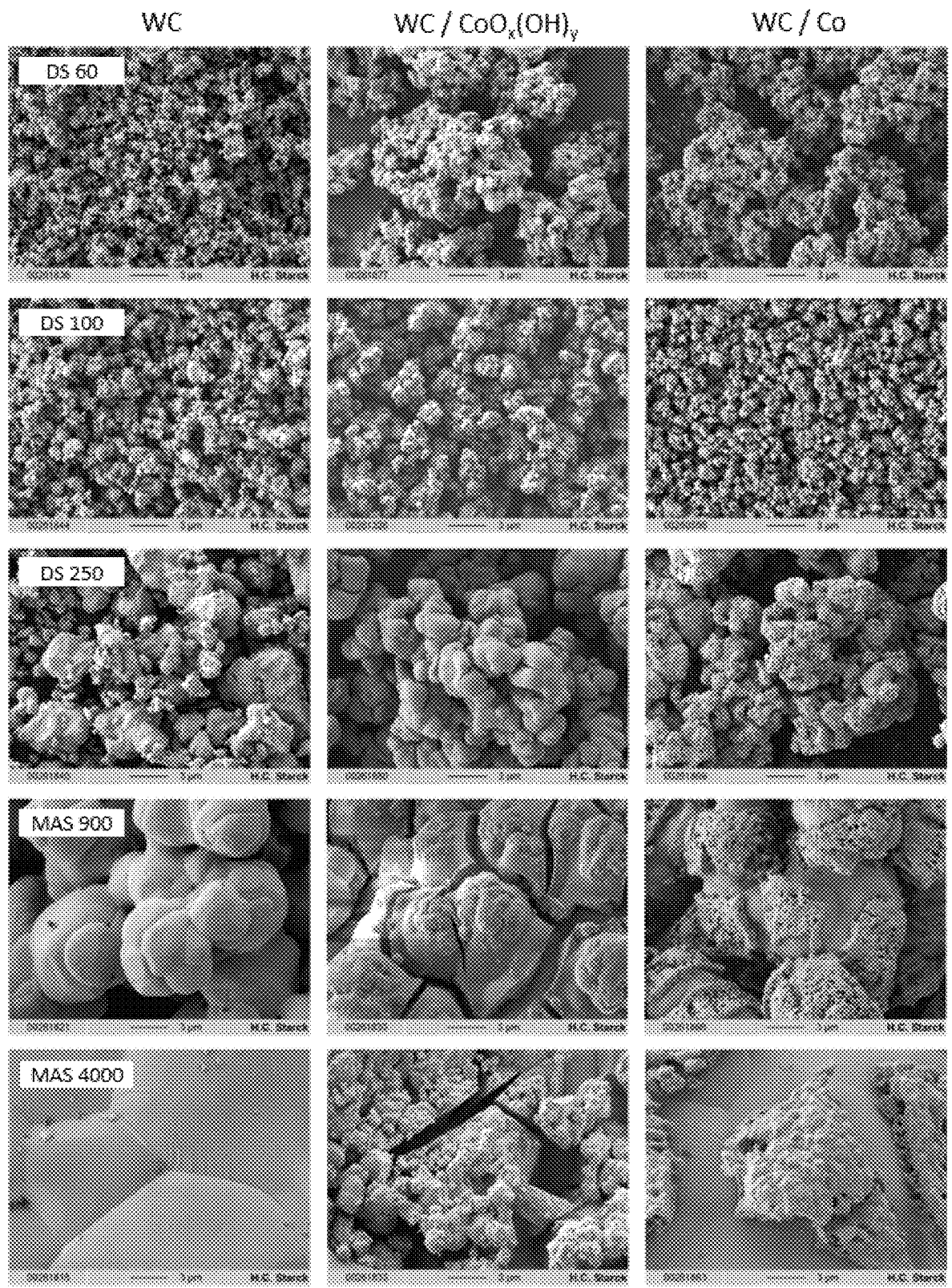

FIG. 3 shows in an electron micrograph that the process according to the invention can be applied to all the usual WC grades. From top to bottom, the micrographs of the 5 Examples are depicted respectively for WC, WC/CoO$_x$(OH)$_y$, and WC/Co.

It can be seen that the coating is formed almost perfectly with a low layer thickness in fine WC powders. For larger WC particles, the layer thickness increases for the same cobalt content and drying cracks form in the WC coated with Co hydroxide. A shrinking process also occurs naturally during the reduction, since the metallic cobalt has a higher density than that of cobalt hydroxide. In particular, for coarse WC grades, this results in the formation of islands of metallic cobalt on the surface of the WC particles. However, these metallic porous nanoscale cobalt regions do not chip off, but surprisingly remain adhered firmly on the surface of the WC particles and are very uniformly distributed in the powder packing.

Figure 4:
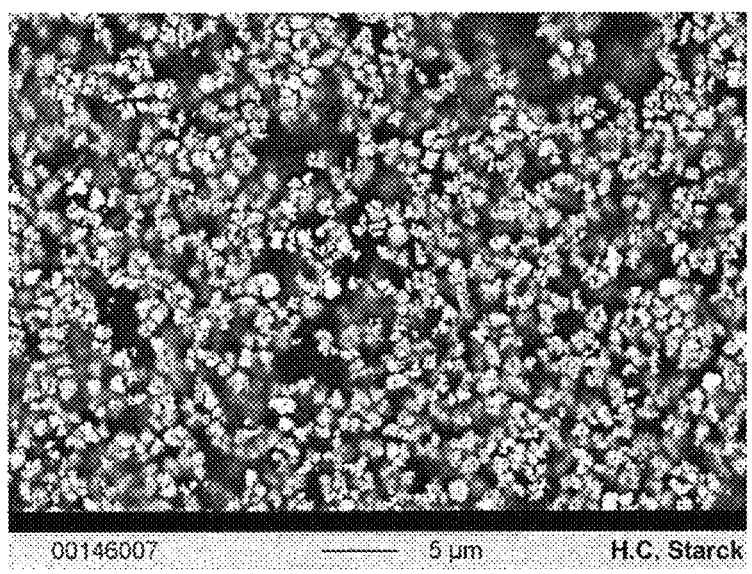

FIG. 4 shows coated WC particles in which the coating was applied by a conventional method. Thus, WC particles were suspended in a CoSO4 solution, the solution was heated to 60° C., and NaHCO$_3$ was added. The obtained particles coated with basic cobalt carbonate were placed into a hydrogen flow in order to reduce the cobalt carbonate to metallic cobalt. As can be seen from FIG. 4, this leads to large cobalt particles that are separate for the major part thereof and do not form a coating.

The invention claimed is:

1. A process for preparing metallic coated hard material particles, comprising the following steps:
   a) providing an aqueous solution comprising at least one cobaltammine complex;
   b) adding metallic hard material particles to the aqueous solution to obtain a suspension comprising hard material particles coated with a hydroxidic cobalt compound wherein the chemical composition of the hydroxidic cobalt compound is described by the formula CoO$_x$(OH)$_y$, wherein y=z−2x, z represents the oxidation state of cobalt, with 2.9≤z≤3, and 0≤x≤z−2; and
   c) separating off the coated metallic hard material particles.

2. The process according to claim 1, characterized in that said hydroxidic cobalt compound is selected from the group consisting of cobalt oxyhydroxide, cobalt hydroxide, and mixtures thereof.

3. The process according to claim 1, characterized in that said metallic hard material is tungsten carbide (WC).

4. The process according to claim 1, characterized in that said at least one cobaltammine complex is a cobalt hexammine complex.

5. The process according to claim 1, characterized in that said aqueous solution in step a) is prepared by admixing an aqueous solution comprising at least one Co(II) salt with ammonia, and subsequently admixing the mixture obtained with an oxidant.

6. The process according to claim 5, characterized in that said Co(II) salt is selected from the group consisting of sulfate, nitrate, chloride, acetate, and mixtures thereof.

7. The process according to claim 1, characterized in that said suspension in step b) further comprises sodium hydroxide.

8. A powder comprising metallic hard material particles, characterized in that the metallic hard material particles have a coating of a hydroxidic cobalt compound, wherein the chemical composition of the hydroxidic cobalt compound is described by the formula $CoO_x(OH)_y$, wherein $y=z-2x$, $z$ represents the oxidation state of cobalt, with $2.9 \leq z \leq 3$, and $0 \leq x \leq z-2$.

9. The powder according to claim 8, characterized in that the coated metallic hard material particles are prepared by a process comprising the following steps:
   a) providing an aqueous solution comprising at least one cobaltammine complex;
   b) adding metallic hard material particles to the aqueous solution to obtain a suspension comprising the metallic hard material particles having the coating of the hydroxidic cobalt compound; and
   c) separating off the coated metallic hard material particles.

10. The powder according to claim 8, characterized in that said coating comprises a maximum of 20% by weight of the powder.

11. The powder according to claim 8, characterized in that the ratio of the particle size of the coated metallic hard material particles to the particle size of the uncoated metallic hard material particles is from 1.05 to 15, as determined according to ISO 13320.

12. The powder according to claim 8, characterized in that the ratio of the particle size according to Fisher Model Sub-Sieve Sizer (FSSS) of the coated metallic hard material particles to the particle size according to FSSS of the uncoated metallic hard material particles is from 1.01 to 4, as determined according to ASTM B330.

\* \* \* \* \*